US005450271A

United States Patent [19]
Fukushima et al.

[11] Patent Number: 5,450,271
[45] Date of Patent: Sep. 12, 1995

[54] PORTABLE COMPUTER DOCKING APPARATUS INCLUDING A KEY MECHANISM CONTROLLING A POWER SUPPLY AND A LOCKING MECHANISM

[75] Inventors: Akira Fukushima; Isamu Miwa; Nobuyuki Kawashima, all of Kanagawa, Japan

[73] Assignee: International Business Machines Corporation, Armonk, N.Y.

[21] Appl. No.: 141,770

[22] Filed: Oct. 22, 1993

[51] Int. Cl.⁶ .................. G06F 1/16; H05K 7/10; H05K 5/02; E05B 73/00
[52] U.S. Cl. ........................ 361/686; 361/726; 361/759; 70/58; 70/DIG. 30; 248/553
[58] Field of Search ............ 70/57, 58, DIG. 30; 248/551, 553; 364/708.1; 361/683–686, 724–727, 741, 756, 759

[56] References Cited
U.S. PATENT DOCUMENTS

| | | | |
|---|---|---|---|
| 5,159,533 | 10/1992 | Kuang | 361/685 |
| 5,164,886 | 11/1992 | Chang | 361/724 X |
| 5,311,397 | 5/1994 | Harshberger et al. | 361/686 X |

*Primary Examiner*—Michael W. Phillips
*Attorney, Agent, or Firm*—Martin J. McKinley; Andrew J. Dillon

[57] ABSTRACT

A key actuated secure docking apparatus for a portable computer locks the apparatus so that internal electronic devices are prevented from being detached from a base body of a docking apparatus, even if the desktop base is left without a docked portable computer. Further, the key mechanism allows the docking apparatus to be placed in a condition in which power supply for the docking apparatus cannot be turned on even if the power switch for the power supply is turned on. Data in a storage device internal to the docking apparatus cannot be stolen or destroyed by attempting docking with a portable computer since power is not supplied to the storage device.

4 Claims, 11 Drawing Sheets

| KEY POSITION | | DETACH COVER | ATTACH OR DETACH COMPUTER | POWER SWITCH ON VALID OR INVALID | PULL OUT KEY |
|---|---|---|---|---|---|
| FIRST KEY POSITION | | POSSIBLE | POSSIBLE | VALID | IMPOSSIBLE |
| SECOND KEY POSITION | LOCKED WITH STOPPER PULLED OUT | IMPOSSIBLE | IMPOSSIBLE | VALID | POSSIBLE |
| | LOCKED WITH STOPPER HOUSED | IMPOSSIBLE | POSSIBLE | VALID | POSSIBLE |
| THIRD POSITION | LOCKED WITH STOPPER PULLED OUT | IMPOSSIBLE | IMPOSSIBLE | INVALID | POSSIBLE |
| | LOCKED WITH STOPPER HOUSED | IMPOSSIBLE | POSSIBLE | INVALID | POSSIBLE |

Fig. 21

PORTABLE COMPUTER DOCKING APPARATUS INCLUDING A KEY MECHANISM CONTROLLING A POWER SUPPLY AND A LOCKING MECHANISM

BACKGROUND OF THE INVENTION

1. Technical Field

The present invention relates to a desktop or docking apparatus for connection to a portable computer allowing expansion in functionality of the portable computer to those expected of a desktop computer.

2. Description of the Related Art

Combining portability and all of the conveniences of a desktop computer such as ample auxiliary storage and communication capability in a notebook PC is not readily achieved. Further, use of a notebook PC on a desk is complicated by the need to connect various cables such as a printer cable, a monitor cable, a communication cable and an AC adapter. Accordingly, desktop bases for portable computers, sometimes called docking units or expansion units, are used to supplement portable computer functionality and ease their use. A docking unit may provide ports for connection of various cables, an added external or auxiliary storage device, a communication device, an AC adapter etc., which may be built into the desktop base. This makes it possible to expand the available functions of a portable computer when used at a permanent station, without the complication of making numerous connections, merely by connecting the portable computer to the desktop base. Exemplary desktop bases for portable computers are disclosed in Japanese Published Unexamined Patent Application (PUPA) No. 3-294917, JA PUPA No. 4-617, Japanese Patent Application No. 3-119220, and JA PUPA No. 3-127933.

However, these prior art devices do not provide adequate security for devices such as an external storage device. In prior art devices, when a desktop base is left without a docked portable computer, it is possible to freely detach the body cover of the desktop base and take away internal electronic components such as a storage device. Further, it is also possible to freely dock another portable computer to the desktop base and steal or destroy data in an internal storage device.

It is known to provide for locking of a portable computer in a desktop base while the portable computer is docked. When the portable computer is locked by docking the portable computer to the desktop base, it becomes impossible to freely detach a body cover of the desktop base and gain physical access to an internal electronic apparatus. However, if the portable computer is docked with the desktop base as a security measure taken to prevent access to the internal electronic apparatus of the desktop base or the stealing or destruction data stored in a storage device in the desktop base, the portable computer itself cannot be freely used.

SUMMARY OF THE INVENTION

An object of the present invention is to provide a desktop base for a portable computer.

Another object of the present invention is to provide security for internal electronic components of a desktop base with docking of a portable computer.

These and other objects are attained as described below. The invention provides a key mechanism for locking internal electronic components to a base body of a desktop base for a portable computer, so that the internal electronic components cannot be freely taken away from the desktop base even if no portable computer is docked thereto. Further, the invention provides a key mechanism for locking a desktop base for a portable computer in the condition under which power is not supplied to the desktop base even if the power switch for the desktop base for a portable computer is turned on, so that data in an internal storage device cannot be stolen or destroyed, even if access to the storage device is attempted by docking another portable computer to the desktop base.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
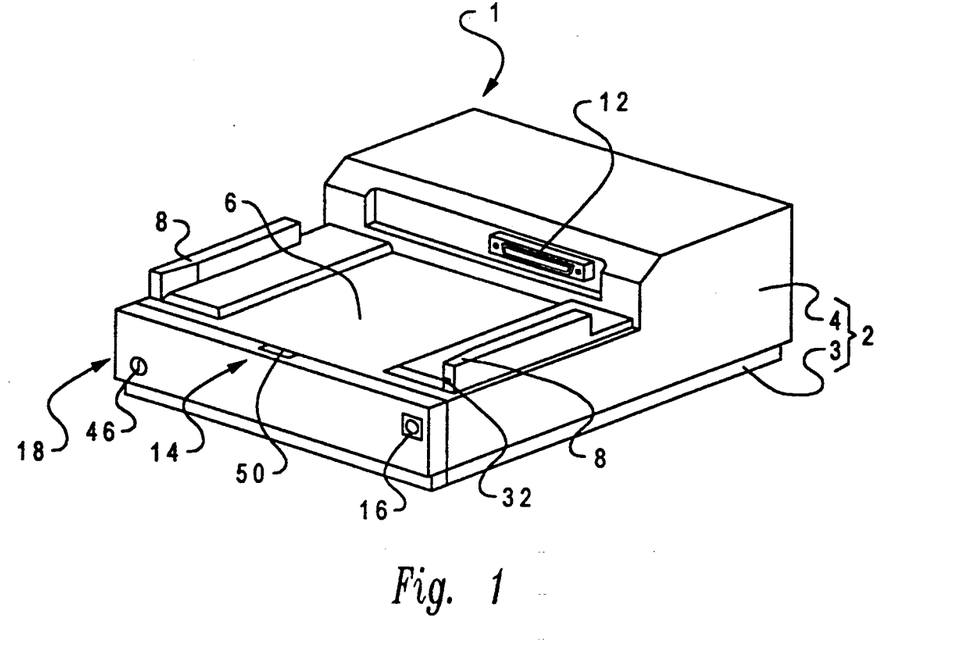
FIG. 1 is a front perspective view showing a desktop base in accord with a first embodiment of the invention for use in docking a portable computer.

FIG. I is a front perspective view of an embodiment of a desktop base for a portable computer according to the present invention. In the figure, a base body 2 of a desktop base I for a portable computer comprises a base 3 and a cover 4. The base body 2 has a supporting section 6, and a guide 8 is provided to both sides of the supporting section 6. Provided on the rear of the supporting section 6 is a connector 12, facing the front side, where it is exposed. Provided on the front side of the supporting section 6 is a lock mechanism 14. Further, provided to the base body 2 are a power switch 16 and a key mechanism 18.

Figure 2:
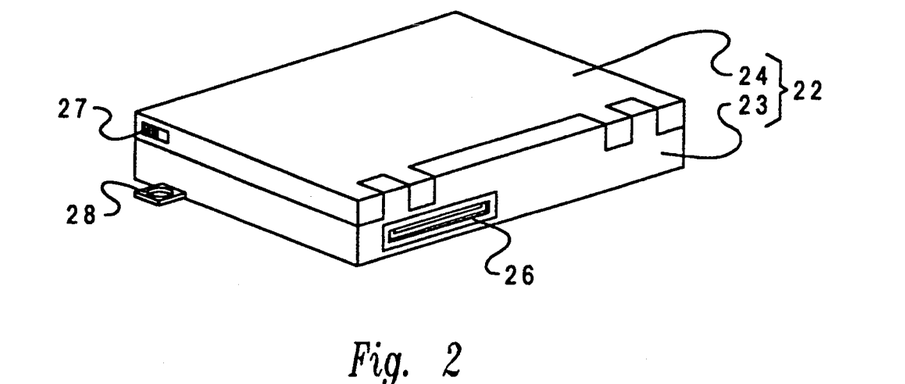
FIG. 2 is a rear perspective view showing a portable computer to be docked to said embodiment.

FIG. 2 shows a portable computer 22 which is mounted on the supporting section 6. The portable computer 22 comprises a system body 23 and a cover 24. Provided in the back of the system body 23 is a connector 26 in the state where it is or can be exposed. The cover 24 is attached to the back side of the system body 23 so as to be capable of being opened. A slider 27 for releasing a latch is provided in a position close to the front edge of the cover 24 so that, by operating the slider 27, a latch mechanism (not shown) for a cover can be released and the cover 24 released from the system body 23. Further, provided to one side of the system body 23 is a mooring convex piece 28. By making fast one end of a chain to the mooring convex piece 28 and fixing the other end of the chain to an appropriate place, it is possible to prevent the computer 22 from being freely taken away. Although the mooring convex piece 28 is drawn out from the system body 23 in FIG. 2, the mooring convex piece 28 may be constructed so as to be housed in the system body 23.

Figure 3:
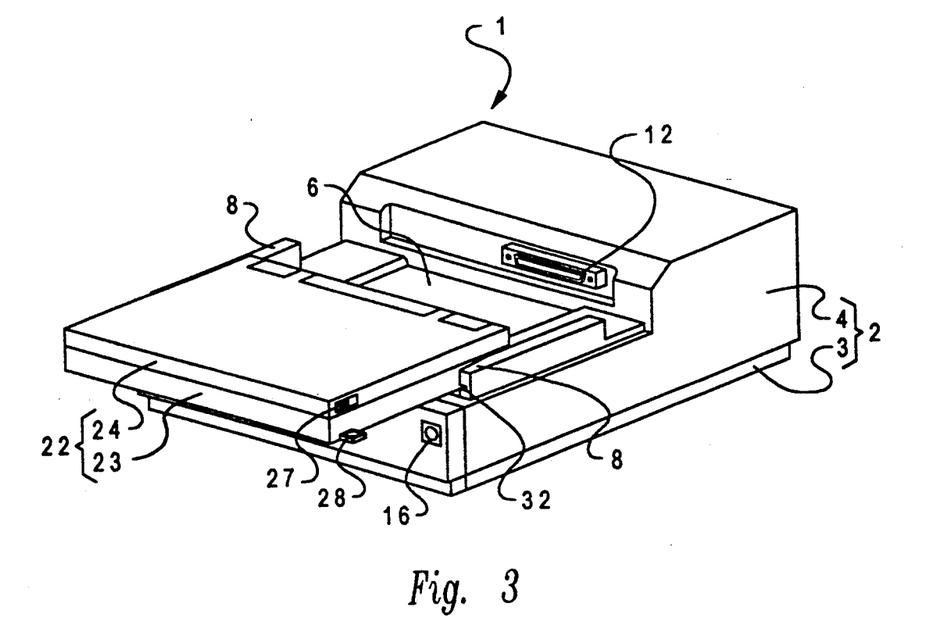
FIG. 3 is a front perspective view showing a desktop base for a portable computer in the process of docking the portable computer.
Figure 4:
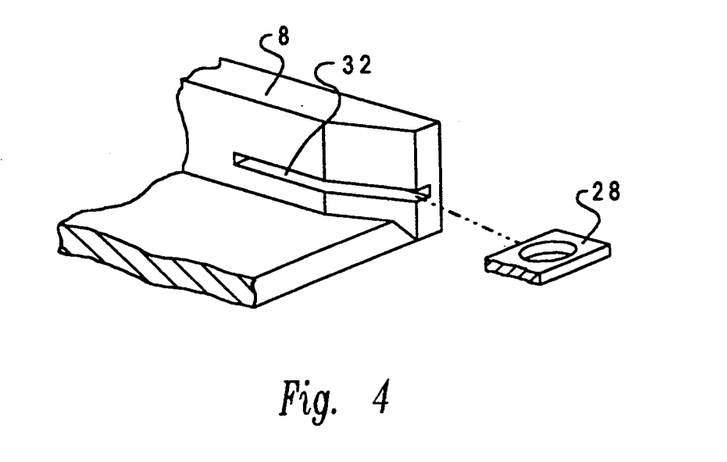
FIG. 4 is enlarged perspective view showing the construction, seen from the front side in a direction different from FIG. 3, of a groove in the desktop base for receiving a mooring convex piece depending from the portable computer.

FIG. 3 shows computer 22 being docked to or detached from the desktop base 1. While being guided between both guides 8, the computer 22 is placed on the supporting section 6 from the rear end of the computer 22 and slid on the supporting section 6 toward the connector 12. The cover 24 may be closed or opened. The mooring convex piece 28 is left drawn out from the system body 23. As shown in FIG. 4, formed in an inner wall of one of guides 8 is a groove 32. The mooring convex piece 28 is intended to be inserted into the groove 32.

Figure 5:
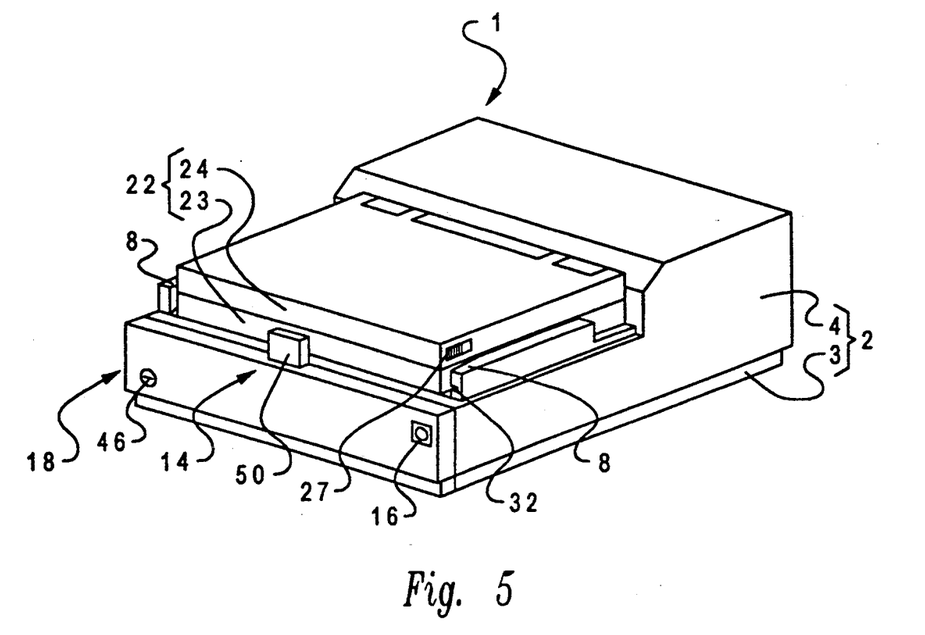
FIG. 5 is a front perspective view showing a portable computer docked with the desktop base.

FIG. 5 shows computer 22 mounted on the desktop base 1. In this state, the connector 26 (FIG. 2) of the computer 22 is connected to the connector 12 of the desktop base 1. Further, with use of lock mechanism 14, described in detail below, the computer 22 cannot be pulled out toward the front side from the desktop base 1. Since the mooring convex piece 28 of the computer 22 is inserted into the groove 32, the computer 22 cannot be detached from the desktop base I by being pulled upward.

Figure 6:
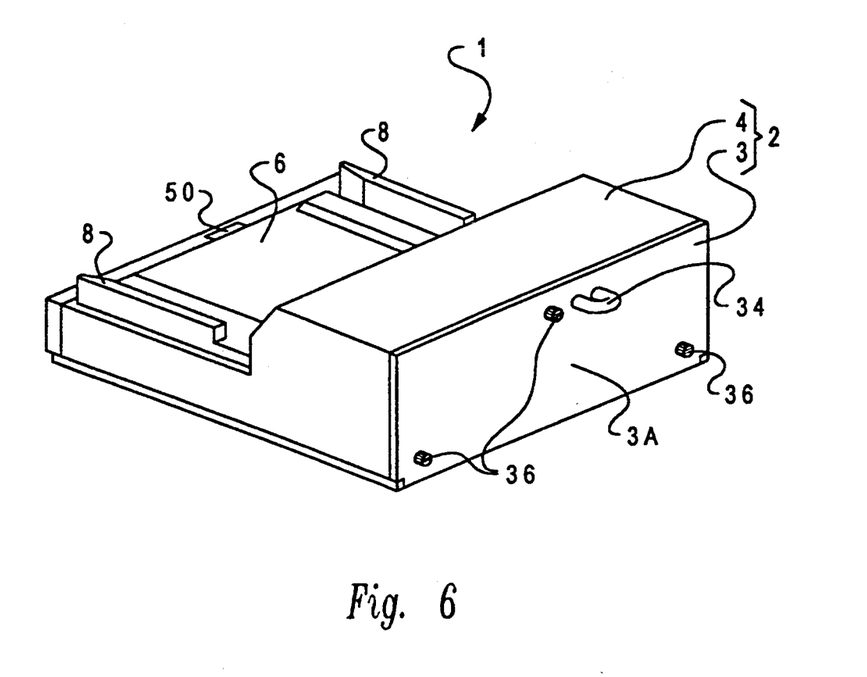
FIG. 6 is a rear perspective view showing the desktop base for a portable computer.
Figure 7:
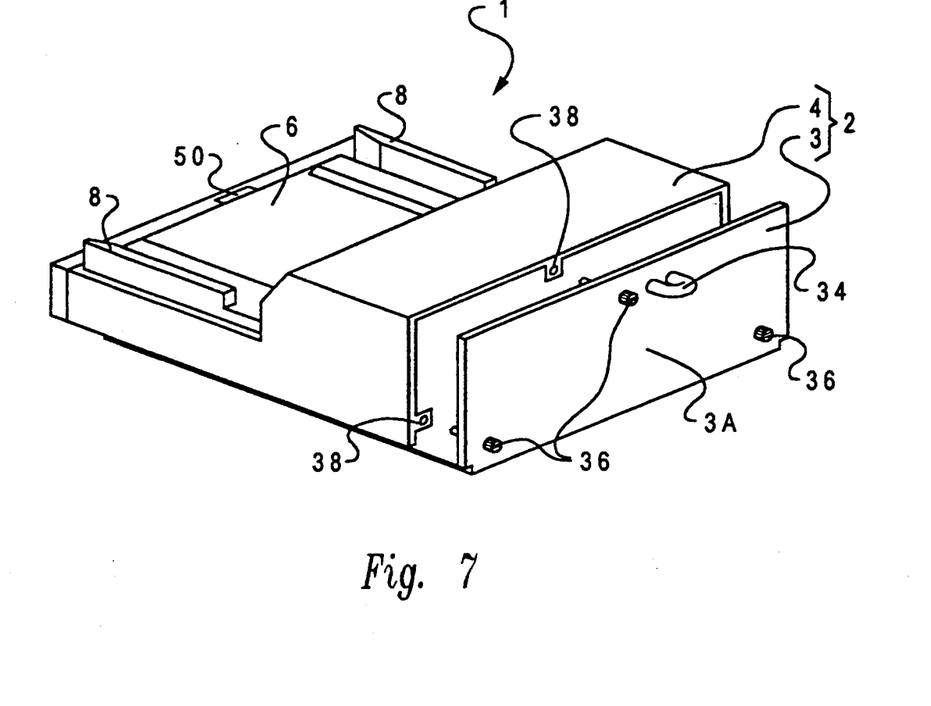
FIG. 7 is a rear perspective view showing a desktop base for a portable computer in the state where a cover is detached from the desktop base.

FIG. 6 and FIG. 7 show the construction, seen from the back side, of the desktop base 1. Provided to a back plate 3A of the base 3 are a mooring fitting 34 and a plurality of screws 36. The mooring fitting 34 is used to make fast the desktop base I to an appropriate place by a chain or the like so that the desktop base I cannot be freely taken away. The screws 36 are used to fix the base 3 to the cover 4 and are intended to fit into nut sections 38 fixed to the cover 4. To detach the cover 4 from the base 3, it is necessary to unfasten the screws 36 from the nut sections 38.

Figure 8:
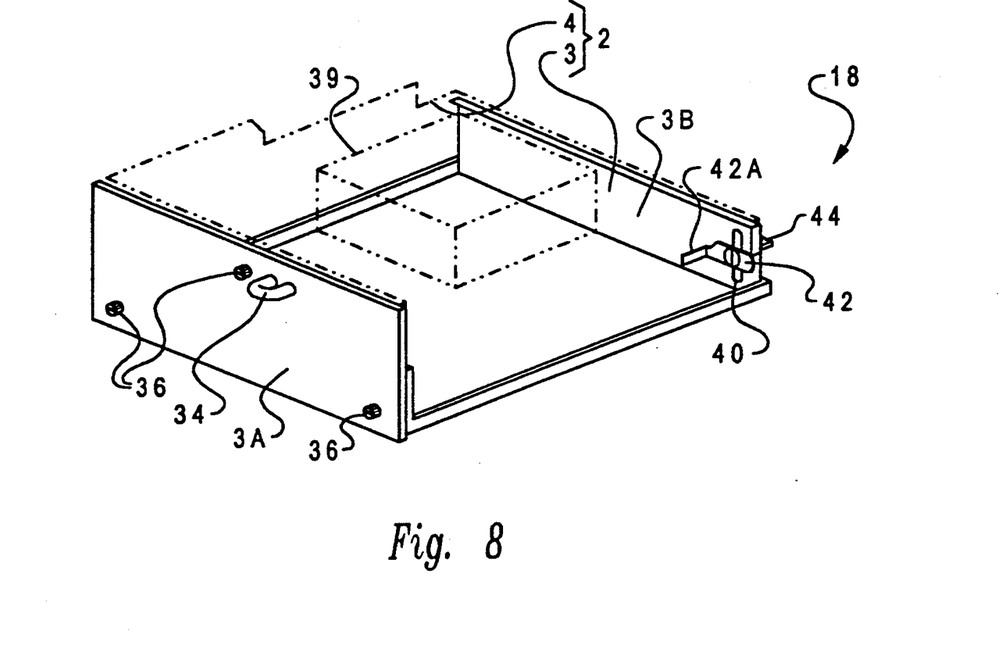
FIG. 8 is a rear perspective view, seen from a direction different from FIG. 7, of the desktop base for a portable computer where the cover is detached.
Figure 9:
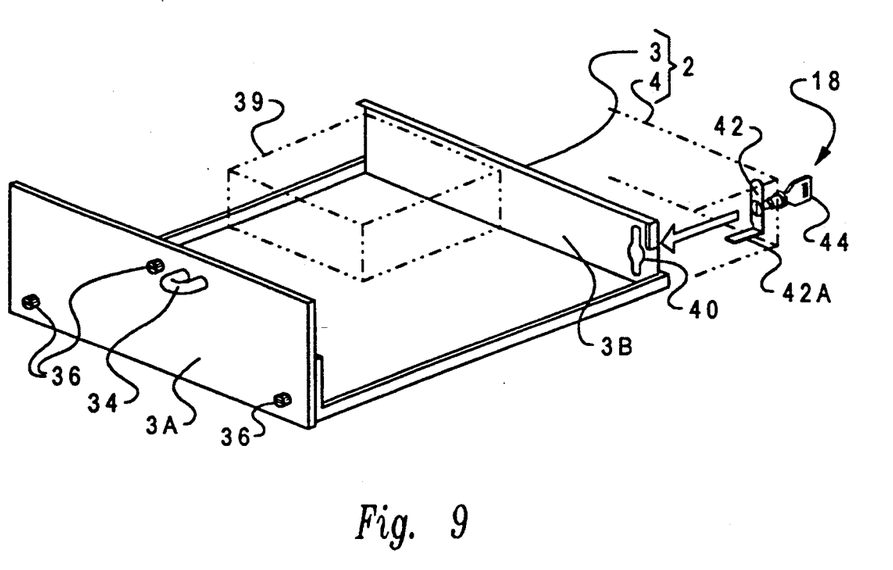
FIG. 9 is a rear perspective view of a desktop base seen from a direction different from FIG. 7, where the cover is detached.

FIG. 8 and FIG. 9 show the construction, seen from the back side, of the desktop base I in the state where the cover 4 is removed. Mounted on the base 3 is an electronic apparatus 39 such as an external storage device. Electronic apparatus other than an external storage device such as a communication device or a power unit, etc. can be also mounted on the base 3, though they are not shown in the figures. Formed in a front plate 3B of the base 3 is a through hole 40. A member 42 of the key mechanism 18 attached to the cover 4 is intended to be inserted into the through hole 40. However, as shown in FIG. 9, the member 42 can be inserted into the through hole 40 only when the position of the member 42 accords with that of the through hole 40.

As shown in FIG. 8, when the position of the member 42 accords with that of the through hole 40, the member 42 can be inserted into the through hole 40. Since the key mechanism 18 is fixed to the cover 4, as shown in FIG. 8, when the position of the member 42 does not accord with that of the through hole 40, the cover 4 cannot be detached from the base 3 even if the screws 36 are unfastened. As a result, the electronic apparatus 39 cannot be detached from the base body 2.

Figure 10:
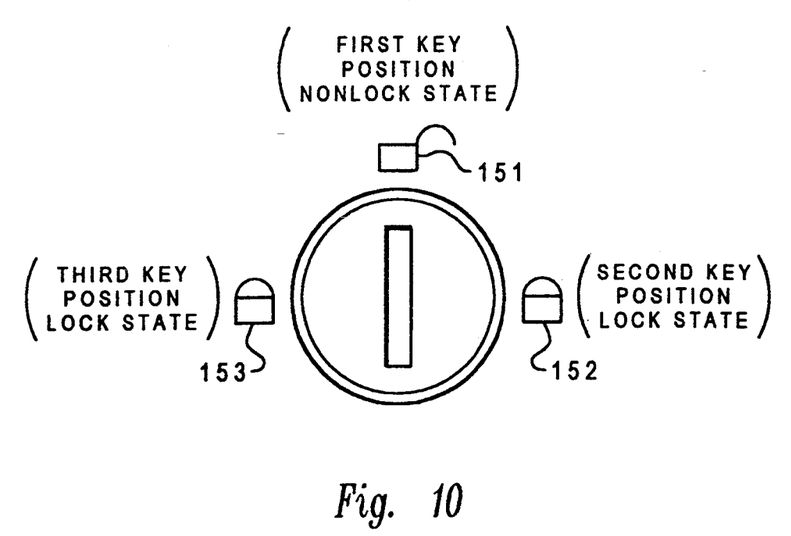
FIG. 10 is an enlarged front view showing marks, around a key hole, for indicating key positions of a key mechanism for a desktop base unit.
Figure 11:
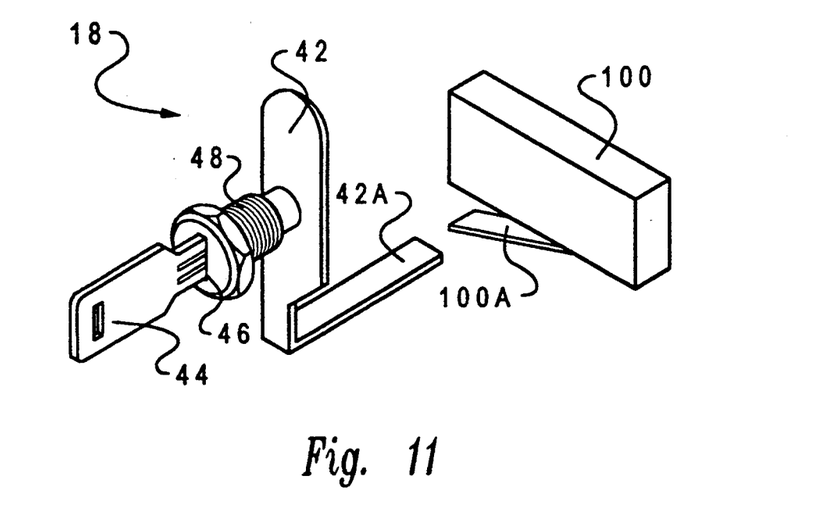
FIG. 11 is an enlarged perspective view showing the key mechanism in a first key position.
Figure 12:
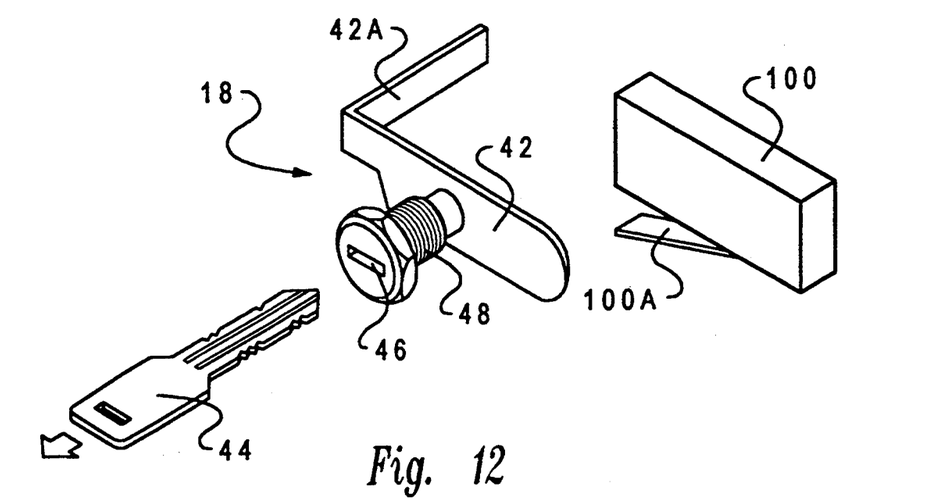
FIG. 12 is an enlarged perspective view showing the key mechanism in a second key position.
Figure 13:
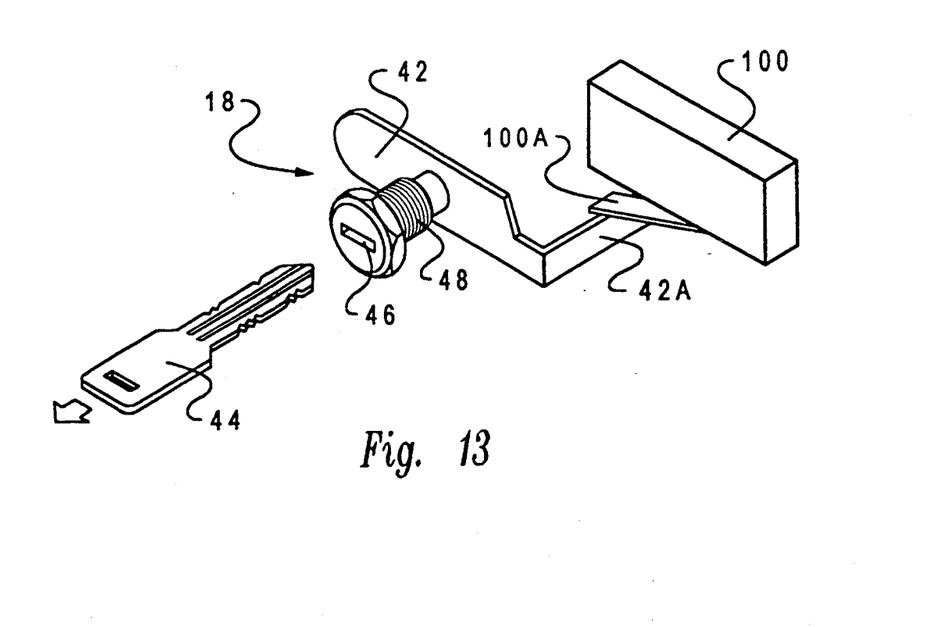
FIG. 13 is an enlarged perspective view showing the key mechanism in a third key position.

FIG. 10 shows three possible key positions of the key mechanism 18, and FIG. 11 to FIG. 13 show the possible dispositions of the key mechanism 18 each of which corresponds to any of the three key positions. As shown in FIG. 11 to FIG. 13, the key mechanism 18 comprises a key 44, a key hole 46, a cylinder 48, and the member 42. The relative position of the member 42 can be changed by rotating the key 44, and the relative position of the member 42 and that of the key 44 are always the same.

In FIG. 10, disposed around the key hole 46 are marks 151, 152, and 153 for indicating that the key mechanism 18 is in any of first, second, and third key positions. The transition between the second key position and the third key position is performed through the first position. FIG. 11, FIG. 12, and FIG. 13 show disposition of the key mechanism 18 in the first, second, and third key positions, respectively.

In the first key position, computer 22 can be freely docked to or detached from the desktop base 1, and cover 4 can be removed from the base 3 (see FIG. 9). Further, the key mechanism 18 is constructed so as to prevent the key 44 from being pulled out from the key hole 46 in its first key position. By preventing the key 44 from being pulled out, it is indicated to an operator that the desktop base I has not been secured. If the key 44 were constructed to be pulled out while in the first key position, a forgetful operator might leave desktop base I remains in an unsecured state after pulling key 44 out. The arrangement provided is intended to prevent such an occurrence.

In the second and third key positions, computer 22 cannot be freely docked to or detached from the desktop base 1, and cover 4 cannot be removed from the base 3 (see FIG. 8). Further, the key mechanism 18 is constructed so as to enable the key 44 to be pulled out from the key hole 46 only in the second and third key positions. The difference between the second key position and the third key position is that the power of the desktop base I can be freely turned on in the second key position. In the third key position, once power is once turned off, it cannot be turned back on. As shown in FIG. 13, in the third key position, a convex piece 42A provided to one end of the member 42 contacts a switch terminal 100A of a keylock microswitch 100.

Figure 14:
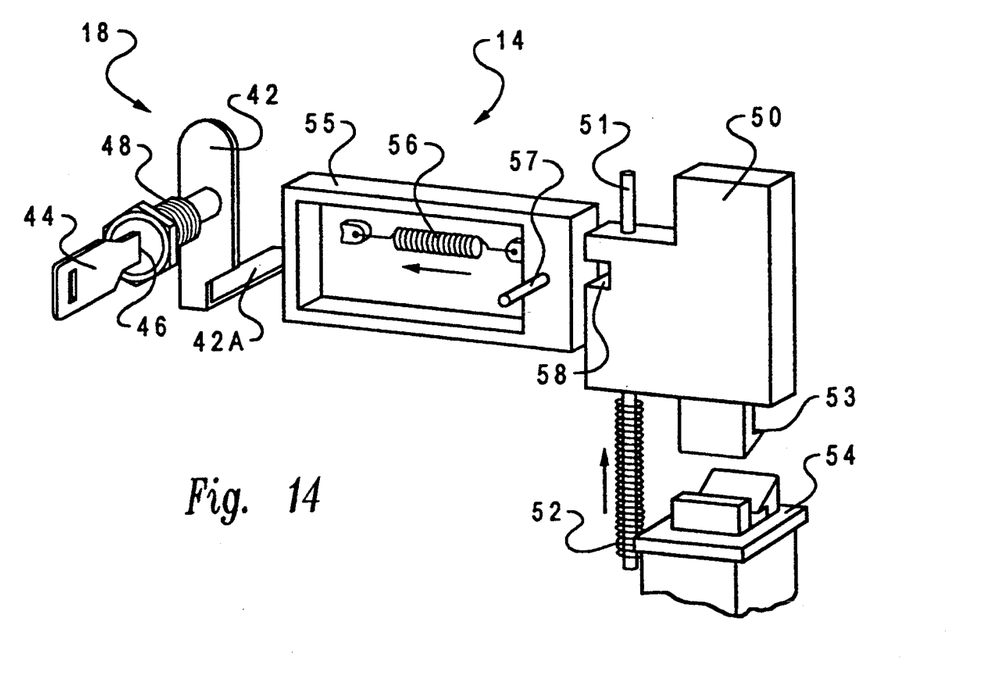
FIG. 14 is an enlarged perspective view showing the construction of the key mechanism and a lock mechanism.

FIG. 14 shows the lock mechanism 14. The lock mechanism 14 has a stopper 50. The stopper 50 is supported by a vertical rail 51 so as to be able to freely move upward and downward. The vertical rail 51 is fixed to a front wall 3B of the base 3. A spring 52 is attached to the vertical rail 51, and tensile force upward is applied to stopper 50 by the spring 52. When the stopper 50 is in a high position, the top section of the stopper 50 protrudes above the supporting section 6 (see FIG. 6). When the stopper 50 is in a low position, the top section of the stopper 50 does not protrude above the supporting section 6. Further, a convex piece 53 for a latch is provided downward from stopper 50, and a latch mechanism 54 is provided below the convex piece 53 for latching. The convex piece 53 for a latch and the latch mechanism 54 work as follows: once pushed down, the stopper 50 is latched by the latch mechanism 54 and is held in the depressed position until released; when pushed down again, the stopper 50 is raised by the spring 52 since the latch mechanism 54 releases the stopper 50 from the state where it is latched. Since the construction itself of the latch mechanism 54 described above is well known, further description is omitted.

In FIG. 14, the lock mechanism 14 has an interlocking body 55. The interlocking body 55 is disposed between the member 42 and the stopper 50 so that the stopper 50 can be influenced by a motion (position) of the member 42 of the key mechanism 18. The interlocking body 55 is supported to the front wall 3B of the base 3 by a guide member (not shown) so as to be able to freely move horizontally. Tensile force is applied to interlocking body 55 by a spring 56 to force it away from the stopper 50, toward member 42. An engaging convex section 57 is formed in the interlocking body 55, and an engaging concave section 58 is formed in the stopper 50. According to the position of the interlocking body 55, the engaging convex section 57 may or may not engage with the engaging concave section 58.

When the member 42 of the key mechanism 18 is aligned in the vertical direction (FIG. 11 and FIG. 14), the interlocking body 55 is moved to a predetermined position close to the left of the key mechanism 18 by the spring 56 and the engaging convex section 57 is moved away from the engaging concave section 58. This allows stopper 50 to move upwardly and downwardly. Further, when the member 42 of the key mechanism 18 is aligned in the horizontal direction (FIG. 12 and FIG. 13), the interlocking body 55 is pushed by the tip section of the member 42 and moved to a predetermined position close to the stopper 50 against the spring 56. In this case, if the stopper 50 is in the state where it is pushed down, the engaging convex section 57 is engaged with the engaging concave section 58 and the stopper 50 is locked in the state where it is pushed down. Further, if the stopper 50 is in the state where it is pushed up, since the engaging convex section 57 is located under the bottom edge of the stopper 50 and prevents the stopper 50 from being pushed down, the stopper 50 is locked in the state where it is pushed up.

Figure 15:
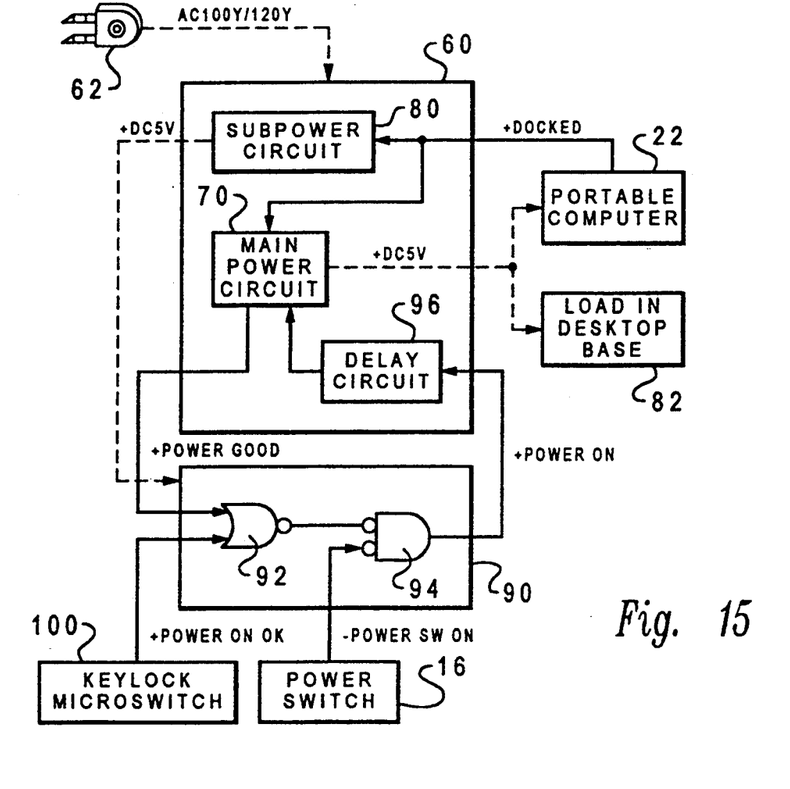
FIG. 15 is a block diagram showing the configuration of a power circuit of a desktop base unit.

FIG. 15 shows a power supply 60 in the desktop base 1. Supplied to the power supply 60 is a predetermined ac voltage, for example, AC 100 V or AC 120 V from an AC inlet 62. The power supply 60 includes not only a main power circuit 70, but also a subpower circuit 80. The main power circuit 70 and the subpower circuit 80 are used to change ac voltage to a predetermined dc voltage, for example, DC 5V. The subpower circuit 80 may be, for example, one for charging a battery for the portable computer 22, and an existing apparatus can be easily utilized as the subpower circuit 80. When the connector 26 of the portable computer 22 is correctly connected to the connector 12 of the desktop base 1, a signal, that is, a "+DOCKED" signal indicating that the computer 22 is docked, is input to the main power circuit 70 and the subpower circuit 80. "+DOCKED=1" is needed so as to enable the main power circuit 70 and the subpower circuit 80. The subpower circuit 80 is immediately enabled by detecting "+DOCKED=1", while the main power circuit 70 is not enabled until it is detected that a "+POWER ON" signal from a power control circuit 90 is "1", in addition to detecting "+DOCKED=1".

A DC output of the main power circuit 70, for example +DC5V, is provided to the computer 22 and a load 82 in the desktop base 1. A DC output of the subpower circuit 80, for example +DC5V, is provided to the power control circuit 90. The power control circuit 90 comprises a NOR circuit 92 and an AND circuit 94. The inputs the NOR circuit 92 include a "+POWER GOOD" signal from the main power circuit 70. When the main power circuit 70 is enabled, "+POWER GOOD=1" is generated. The second input to NOR circuit 92 is a "+POWER ON OK" signal from the keylock microswitch 100. When the operating terminal of the keylock microswitch 100 is operated, "+POWER ON OK=0" is generated. The operating terminal of the keylock microswitch 100 is operated, as shown in FIG. 13, when the key mechanism 18 is in the third key position and "+POWER ON OK=0" is generated. As shown in FIG. 11 and FIG. 12, when the key mechanism 18 is in the first or second key position, the 8 keylock microswitch 100 is not operated and "+POWER ON OK=1" is generated.

The output of the NOR circuit 92 is provided to an inverting input to AND circuit 94. Provided to a second inverting input of AND circuit 94 is a "-POWER SW ON" signal from the power switch 16. When the power switch 16 is turned on, "-POWER SW ON=0" is generated. The AND circuit 94 outputs a "+POWER ON" signal. The "+POWER ON" signal is provided as an input to the main power circuit 70 through a delay circuit 96.

The power control circuit 90 is now further described. In the state where the main power circuit 70 is already enabled, "+POWER GOOD=1" is output. If "+POWER ON OK=1" becomes "+POWER ON OK=0" by moving the key mechanism 18 from the first or second key position to the third key position, the output of the NOR circuit 92 is not changed. Accordingly, the output of the AND circuit 94 does not change as well. That is, in the state where the main power circuit 70 is already enabled, even if the key mechanism 18 is operated from the first or second key position to the third key position, the main power circuit 70 is not turned off.

When the main power circuit 70 is once turned off, "+POWER GOOD=0" is output. When the key mechanism 18 is set to the third key position and "+POWER ON OK =0" is input, the output of the AND circuit 94, that is, "+POWER ON" always becomes "0". That is, after the main power circuit 70 is once turned off, it becomes impossible to enable the main power circuit 70 by moving the key mechanism 18 to the third key position, even if the power switch 16 is turned on.

A delay circuit 96 is now described. The delay circuit 96 is intended to prevent the main power circuit 70 from being incorrectly enabled in a transition period during which the subpower circuit 80 is completely enabled after it detects "+DOCKED=1", that is, during a period of time when the output of the power control circuit 90 is unstable. By providing the delay circuit 96, it is possible to prevent the main power circuit 70 from being raised, in any of the following cases: (1) the AC inlet 62 is connected to an AC power outlet when the key mechanism 18 is in the third key position, or the portable computer 22 is docked to the desktop base 1, in the state where the power switch 16 is turned on, when the key mechanism 18 is in the third key position; and (2) the power switch 16 is turned on and the AC inlet 62 is connected to an AC power outlet in the state where the portable computer 22 is docked with the desktop base 1.

Figure 16:
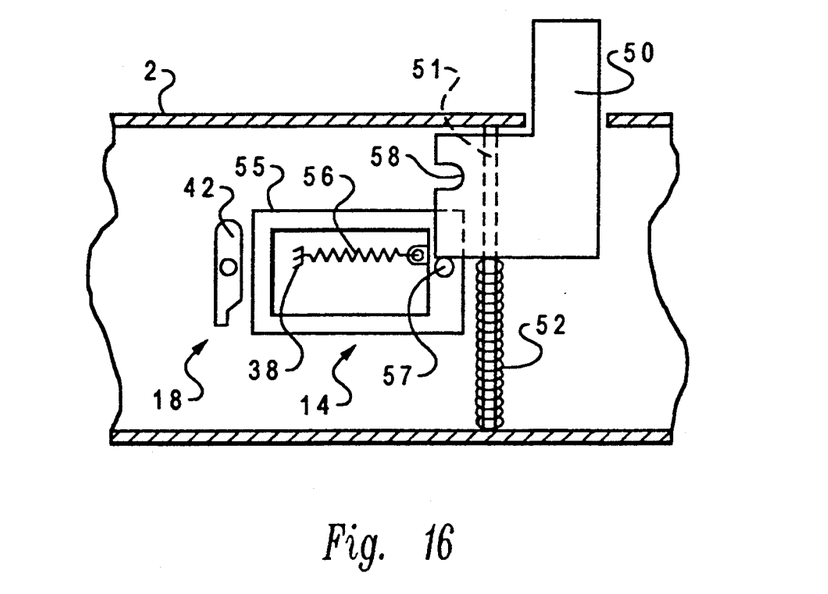
FIG. 16 is an enlarged front view showing the key mechanism and the lock mechanism in the first key position of FIG. 11.

Operation of this embodiment is described in detail by reference to FIG. 16 to FIG. 20. FIG. 16 shows a key mechanism 18 in the first key position. Member 42 is vertically aligned, the interlocking body 55 is located at its closest approach to the key mechanism 18 within a predetermined range of its movement, and the stopper 50 is released from the interlocking body 55 and is capable of freely moving upward and downward. To dock the portable computer 22 to the desktop base 1, the stopper 50 should be pushed downward so that the latch mechanism 54 can work. When the stopper 50 is pushed downward again after the portable computer 22 is docked with the desktop base 1, the latch mechanism 54 releases the stopper 50, and the stopper 50 is raised by the tensile force of the spring 52. To stabilize the state where the portable computer 22 is docked with the desktop base 1, it is preferable that the stopper 50 should be raised. Thus, in the first key position, the portable computer 22 can be freely docked to and detached from the desktop base 1.

Further, in the first key position, the main power circuit 70 can be freely turned on by operating the power switch 16, and the cover 4 can be freely detached from the base 3. That is, in the first key position, there is no limit to physical access and electric access to the internal storage device 39. In the first key position, the key 44 cannot be pulled out from the key hole 46.

Figure 17:
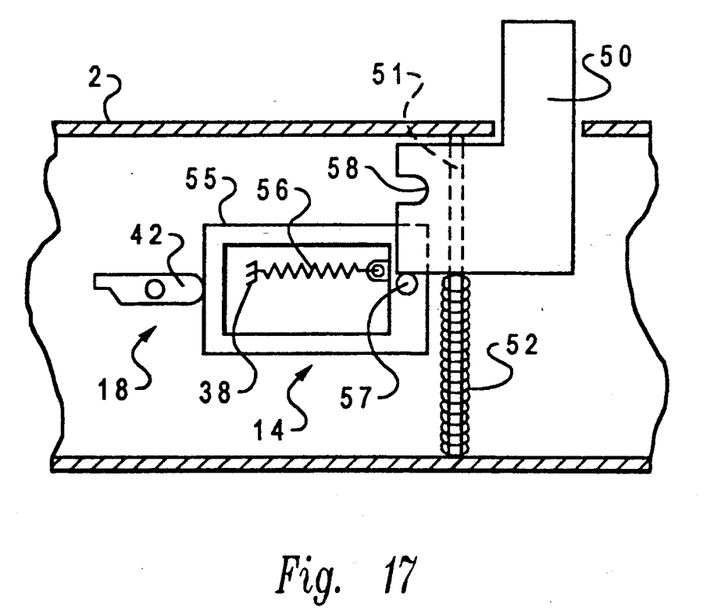
FIG. 17 is an enlarged front view showing the key mechanism and the lock mechanism in a state where a stopper is raised, in the second key position of FIG. 12.

FIG. 17 shows a state that the stopper 50 is pulled out and the key mechanism 18 is in the second key position. In the state, the member 42 is aligned with a horizontal direction, the interlocking body 55 is located most closely to the stopper 50 within the predetermined range of its movement, and the engaging convex section 57 of the interlocking body 55 is located under the lower end of the stopper 50 so as to prevent the interlocking body 55 from moving. If the portable computer 22 is docked with the desktop base 1, the portable computer 22 cannot be detached from the desktop base 1. In the second key position, the main power circuit 70 can be freely turned on by operating the power switch 16, but the cover 4 cannot be detached from the base 3.

Further, in the second key position, the key 44 can be pulled out from the key hole 46.

Figure 18:
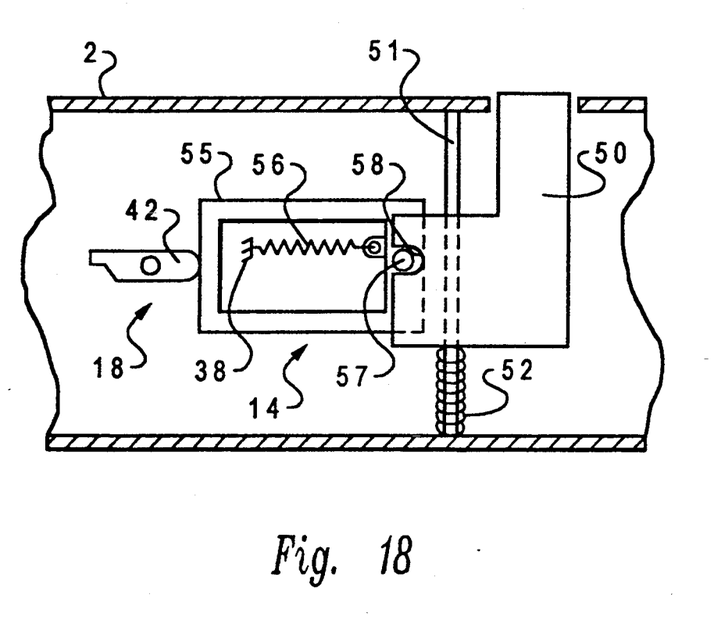
FIG. 18 is an enlarged front view showing the key mechanism and the lock mechanism, in the state where the stopper is housed, in the second key position.

FIG. 18 shows a state in which the stopper 50 is pushed in and the key mechanism 18 is in the second key position. In the state, the member 42 is horizontally aligned, the interlocking body 55 is located most closely to the stopper 50 within the predetermined range of its movement, and the engaging convex section 57 of the interlocking body 55 is engaged with the engaging concave section 58 of the stopper 50 so as to prevent the interlocking body 55 from moving. If the portable computer 22 is not docked with the desktop base 1, the portable computer 22 can be freely docked to the desktop base 1. Further, in the second key position, the desktop base I can be freely utilized since the main power circuit 70 can be freely turned on by operating the power switch 16, but the cover 4 cannot be detached from the base 3. The key 44 can be pulled out from the key hole 46.

Figure 19:
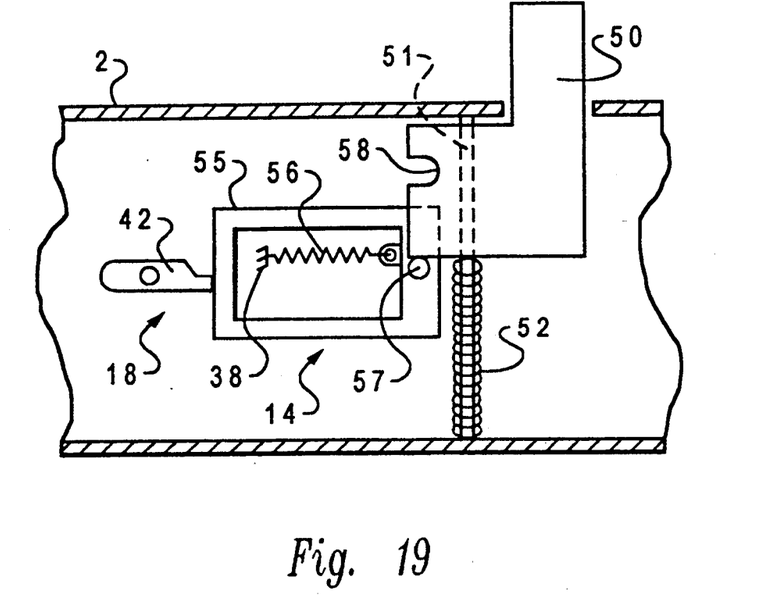
FIG. 19 is an enlarged front view showing the key mechanism and the lock mechanism, in the state where the stopper is raised, in the third key position of FIG. 13.

FIG. 19 shows a state in which the stopper 50 is pulled out and the key mechanism 18 is in the third key position. In the state, the member 42 is horizontally aligned, the interlocking body 55 is located most closely to the stopper 50 within the predetermined range of its movement, and the engaging convex section 57 of the interlocking body 55 is located under the lower end of the stopper 50 so as to prevent the interlocking body 55 from moving. If the portable computer 22 is docked with the desktop base 1, the portable computer 22 cannot be detached from the desktop base 1. In the third key position, even if the power switch 16 is turned on, the main power circuit 70 cannot be enabled. However, even if the key mechanism 18 is incorrectly set to the third key position when the main power circuit 70 is already in an ON state, power supply does not fall. Therefore, user data is not lost due to inadvertent operation of key mechanism 18. The cover 4 cannot be detached from the base 3. The key 44 can be pulled out from the key hole 46.

Figure 20:
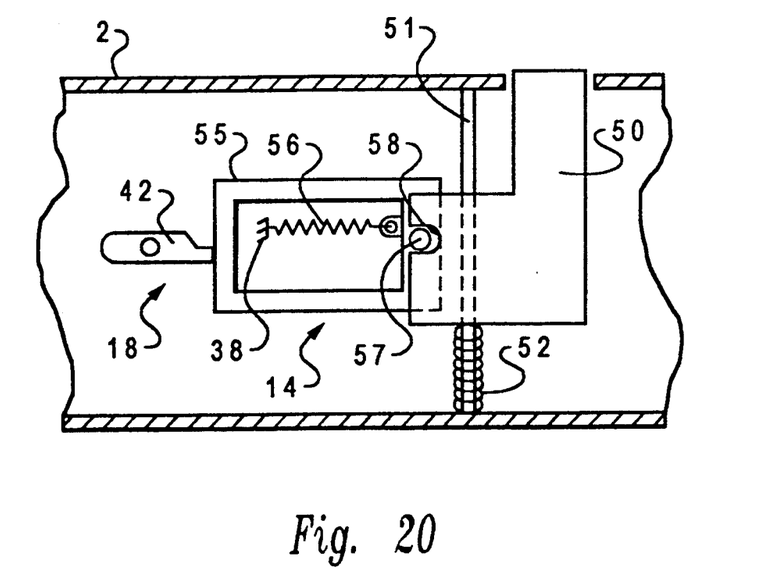
FIG. 20 is an enlarged front view showing the key mechanism and the lock mechanism, in the state where the stopper is housed, in the third key position.

FIG. 20 shows a state in which the stopper 50 is pushed in and the key mechanism 18 is in the third key position. In the state, the member 42 is aligned in the horizontal direction, the interlocking body 55 is located most closely to the stopper 50 within the predetermined range of its movement, and the engaging convex section 57 of the interlocking body 55 is engaged with the engaging concave section 58 of the stopper 50 so as to prevent the interlocking body 55 from moving. If the portable computer 22 is not docked with the desktop base 1, the portable computer 22 can be freely docked to the desktop base 1, but the main power circuit 70 cannot be enabled even if the power switch 16 is turned on. Therefore, even if the portable computer 22 is freely docked to the desktop base 1, the electronic equipment 39 in the desktop base I cannot be accessed. Further, the cover 4 cannot be detached from the base 3. The key 44 can be pulled out from the key hole 46.

Figure 21:
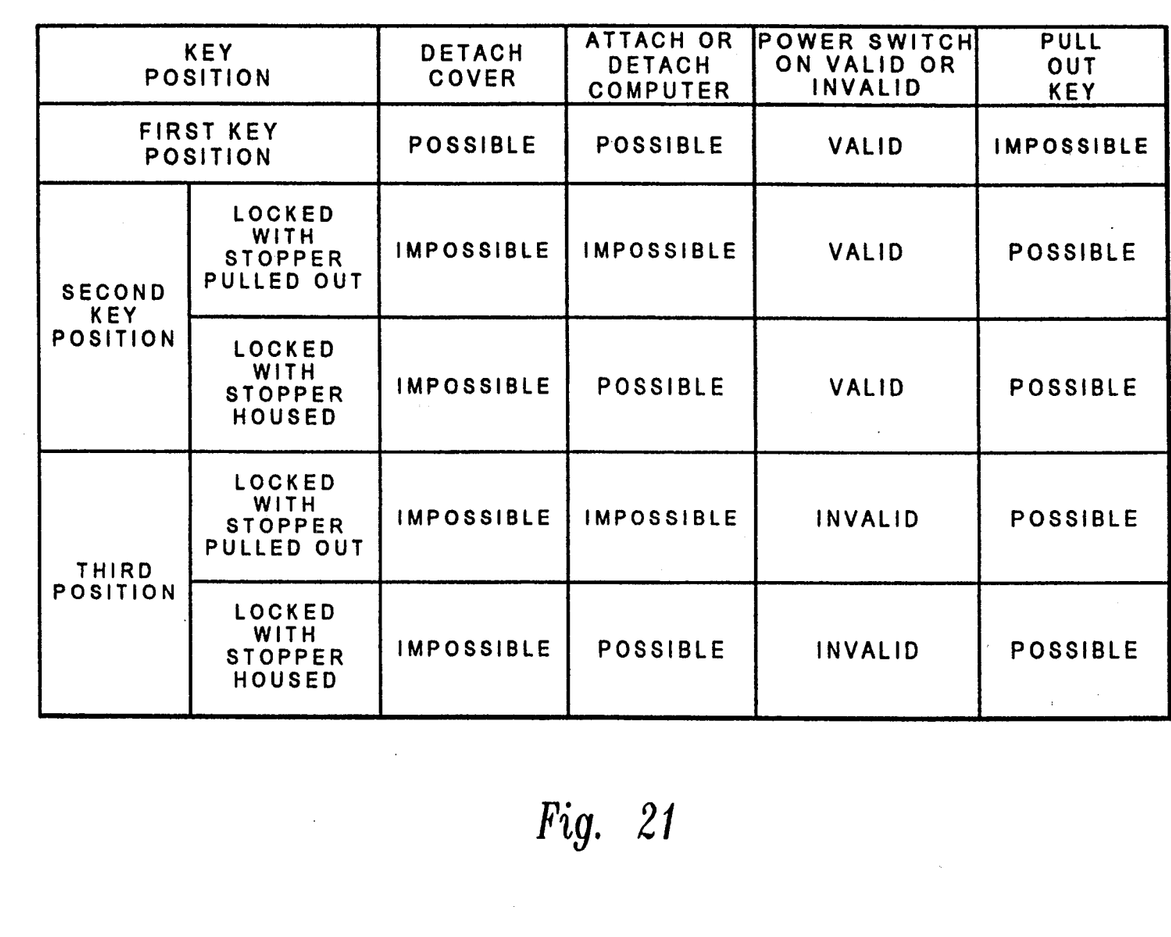

With reference now to FIG. 21, there is illustrated a table summarizing the operations which a user may perform with key mechanism 18 in the first, second, and third key positions.

According to such an embodiment as described above, it is possible to sufficiently take a security measure to the internal electronic apparatus 39 such as a storage device whether the portable computer 22 is docked or not. Further, it is also possible to restrict the physical access to the electronic apparatus 39 even if the computer 22 is allowed to be freely docked to and detached from the desktop base 1.

Besides, though the desktop base 1, in said embodiment, is what is called an expanded function unit or an expansion box having an internal electronic apparatus for working in cooperation with the computer 2:2, it will be appreciated that the present invention may be applied not only to an expanded function unit etc., but also to a power supply which only supplies an electrical power, or to a connector unit having various connectors with or without power supply. Or, the present invention may be applied to a simple desktop base to which neither power is supplied nor a connector is provided. Further, a top board may be attached to a desktop base so as to become a supporting board of a CRT. Still further, instead of the groove 32 and the mooring convex piece 28 of said embodiment, a channel may be formed in both sides of a computer, and a convex section which is inserted into said channel so as to control the detachment of the computer may be formed in a desktop base.

According to the present invention, a security measure can be sufficiently taken to an internal electronic apparatus such as a storage device even in the state where a portable computer is not docked.

While the invention has been particularly shown and described with reference to a preferred embodiment, it will be understood by those skilled in the art that various changes in form and detail may be made therein without departing from the spirit and scope of the invention.

What is claimed is:

1. A docking apparatus for a portable computer, comprising:
    a body for supporting the portable computer;
    a connector into said body, wherein said connector provides electrical connection to the portable computer;
    an electronic apparatus provided within said body for connection to the portable computer through said connector and for working in cooperation with the portable computer;
    a power supply electrically coupled to said electronic apparatus for supplying power to said electronic apparatus;
    a power switch electrically coupled to said power supply for turning on or off said power supply;
    a power controller switching means having two states;
    a power controller circuit electrically coupled to said power supply which can be operated so as not to turn on said power supply even if said power switch is turned on in response to a first state of said power controller switching means; and
    a key mechanism mounted in said body, wherein a position of said key mechanism determines said state of said Dower controller switching means.

2. The docking apparatus for a portable computer according to claim 1, wherein said key mechanism can be operated to lock said electronic apparatus in a state in which said electronic apparatus is prevented from being detached from said body.

3. A docking apparatus for a portable computer comprising:
    a body for supporting a portable computer;
    a connector provided to said body for electrical connection to the portable computer;
    an electronic apparatus provided within said body for connecting to an electronic circuit in the portable computer through said connector and for cooperating with the electronic circuit;
    a power supply electrically coupled to said electronic apparatus for supplying power to said electronic apparatus;
    a power switch electrically coupled to said power supply for turning on or off said power supply;
    a power controller switching means having two states:
    a power controller circuit electrically coupled to said power supply for preventing use of said power switch to turn said power supply on in response to a first state of said power controller switching means;
    a lock mechanism provided to said body having two states, a lock state where the portable computer is prevented from being detached from said body and unlocked state where the portable computer is allowed to be detached from said body; and
    a key mechanism provided to said body having first, second, and third key positions which determine said state of said power controller switching means, said key mechanism allowing the portable computer to be detached from said body when said lock mechanism is set to an unlocked state corresponding to said first key position, said key mechanism allowing said power supply to be turned on when said power switch is turned on when said lock mechanism is set to a locked state corresponding to said second key position, and said key mechanism preventing said power supply from being turned on by bringing said power controller circuit into operation when said lock mechanism is set to a locked state corresponding to said third key position.

4. The docking apparatus for a portable computer according to claim 3, wherein said power controller circuit allows said power supply to continue in an ON state if said power supply is already in the ON state before said key mechanism is moved to said third key position.

* * * * *

UNITED STATES PATENT AND TRADEMARK OFFICE
CERTIFICATE OF CORRECTION

PATENT NO. : 5,450,271
DATED : September 12, 1995
INVENTOR(S) : Fukushima et al.

It is certified that error appears in the above-indentified patent and that said Letters Patent is hereby corrected as shown below:

Column 3, line 11: insert --FIG. 21 illustrates a table summarizing the operations which a user may perform when the key mechanism is in the first, second, and third key positions.--

Column 3, line 14: change "l" to --1--

Column 3, line 65: change "l" to --1--

Column 4, line 3: change "l" to --1--

Column 4, line 4: change "l" to --1--

Column 4, line 11: change "l" to --1--

Column 4, line 39: delete "relative"

Column 4, line 58: change "l" to --1--

Column 4, line 61: change "l" to --1--

Column 5, line 4: change "l" to --1--

UNITED STATES PATENT AND TRADEMARK OFFICE
CERTIFICATE OF CORRECTION

PATENT NO. : 5,450,271

DATED : September 12, 1995

INVENTOR(S) : Fukushima et al.

It is certified that error appears in the above-indentified patent and that said Letters Patent is hereby corrected as shown below:

Column 8, line 15: change "l" to --1--

Column 8, line 56: change "l" to --1--

Column 9, line 6: change "2:2" to --22--

Column 10, line 3: change "Dower" to --power--

Column 10, line 11: change "a" to --the-- second occurrance

Signed and Sealed this

Sixteenth Day of July, 1996

Attest:

BRUCE LEHMAN

Attesting Officer    Commissioner of Patents and Trademarks